United States Patent [19]
Fujioka

[11] Patent Number: 5,455,771
[45] Date of Patent: Oct. 3, 1995

[54] TRACTION CONTROL PERMIT/PROHIBIT DETERMINATION APPARATUS

[75] Inventor: Hideaki Fujioka, Itami, Japan

[73] Assignee: Sumitomo Electric Industries, Ltd., Osaka, Japan

[21] Appl. No.: 18,723

[22] Filed: Feb. 17, 1993

[30] Foreign Application Priority Data

Feb. 24, 1992 [JP] Japan .................. 4-036017

[51] Int. Cl.$^6$ ..................... B60T 8/58
[52] U.S. Cl. ................... 364/426.03; 180/197
[58] Field of Search ........... 364/426.02, 426.03; 180/197; 303/95, 97, 100, 103

[56] References Cited

U.S. PATENT DOCUMENTS

| | | | |
|---|---|---|---|
| 3,776,355 | 12/1973 | Scherenberg | 180/197 |
| 4,484,280 | 11/1984 | Brugger et al. | 364/426.03 |
| 4,964,679 | 10/1990 | Rath | 180/179 |
| 4,998,782 | 3/1991 | Thatcher et al. | 364/426.03 |
| 5,000,281 | 3/1991 | Nobumoto et al. | 364/426.02 |
| 5,092,436 | 3/1992 | Sterler | 180/197 |
| 5,159,991 | 11/1992 | Tsuyama et al. | 364/426.03 |
| 5,172,960 | 12/1992 | Chareire | 364/426.02 |
| 5,265,694 | 11/1993 | Yamashita | 364/426.02 |
| 5,315,519 | 5/1994 | Chin et al. | 364/426.02 |

FOREIGN PATENT DOCUMENTS

| | | |
|---|---|---|
| 0303470 | 2/1989 | European Pat. Off. . |
| 0330149 | 8/1989 | European Pat. Off. . |
| 0390088 | 10/1990 | European Pat. Off. . |
| 0397330 | 11/1990 | European Pat. Off. . |
| 4029235 | 3/1992 | Germany . |

*Primary Examiner*—Gary Chin
*Attorney, Agent, or Firm*—Sandler, Greenblum & Bernstein

[57] ABSTRACT

A traction control permit/prohibit determination apparatus has a traction controller which applies a traction brake pressure to a brake system provided on the drive wheel when spinning of the drive wheel is detected. The traction controller is set to an operation permit mode when the vehicle speed is in the low speed range, and set to an operation prohibited mode when the vehicle speed is in the high speed range. Also, the traction controller is set to an operation permit mode when the pad temperature is below a first predetermined temperature, and to an operation prohibited mode when the pad temperature is above a second predetermined temperature.

20 Claims, 10 Drawing Sheets

IV. TRACTION CONTROL PERMIT/PROHIBIT DETERMINATION BY BRAKE PAD TEMPERATURE

TRACTION CONTROL PERMIT/PROHIBIT DETERMINATION APPARATUS

BACKGROUND OF THE INVENTION

1. Field of the Invention

The present invention relates to a traction control apparatus used to suppress spinning (no-load driving) of the drive wheels on a motor vehicle, and relates more particularly to a traction control permit/prohibit determination apparatus for determining whether traction control should be permitted or should be prohibited under various different conditions.

2. Description of the Prior Art

Traction control devices have been used for years to maintain drive stability during initial starting and acceleration of a motor vehicle, and are generally used to improve the drive performance of the vehicle. When a drive wheel starts to spin, the traction control device suppresses wheel spinning by automatically restricting engine output, even overriding depression of the accelerator by the driver, or automatically applying traction control brake pressure to the spinning drive wheel.

Engine output control-type traction control devices that function by restricting the engine output are described in U.S. Pat. Nos. 4,484,280 and No. 3,776,355, and a brake control type traction control device that functions by applying traction brake pressure to the spinning wheel is described in British patent GB8719299.

In general, brake control systems introduce certain undesirable mechanical affects, including faster wearing of the brake pads, and excessive torque between the engine parts generating the drive power and the brakes, which adversely affects the entire drive system from the engine to the wheels. Because of these problems, numerous hybrid traction control devices combining both engine output control and brake control have been developed and used.

While the traction control device is distinct from the antilock brake control system (ABS), these two assemblies can share many common parts, and the brake control system can use the ABS solenoid valve to directly increase or decrease the brake pressure.

A traction control device that uses only brake control to reduce manufacturing costs has also been proposed (British patent GB8719299).

With a traction control device that uses only brake control, however, traction brake pressure may be frequently applied and may even be applied in the medium and high speed ranges where traction control is virtually never needed. As a result, brake pad wear is accelerated, and the brake system and drive system may be adversely affected.

SUMMARY OF THE INVENTION

Therefore, an object of the present invention is to provide a traction control permit/prohibit determination apparatus that can minimize the adverse affects of brake-only traction control.

To achieve this object, a traction control permit/prohibit determination apparatus for used in a vehicle having a drive wheel comprises: wheel speed detection means for detecting the speed of each wheel; vehicle speed detecting means for detecting the vehicle speed based on the wheel speeds, wheel spin detecting means for detecting a spinning of the drive wheel; traction control means for applying a traction brake pressure to a brake system provided on the drive wheel when said wheel spin detecting means detects spinning of the drive wheel; speed range determination means for determining whether the vehicle speed is in a low speed range, intermediate speed range, or high speed range; and first prohibit means for setting said traction control means to an operation permit mode when the vehicle speed is in the low speed range, and setting the traction control means to an operation prohibited mode when the vehicle speed is in the high speed range.

Also, according to the present invention, a traction control permit/prohibit determination apparatus for used in a vehicle having a drive wheel comprises: wheel speed detection means for detecting the speed of each wheel; vehicle speed detecting means for detecting the vehicle speed based on the wheel speeds; wheel spin detecting means for detecting a spinning of the drive wheel; traction control means for applying a traction brake pressure to a brake system provided on the drive wheel when said wheel spin detecting means detects spinning of the drive wheel; pad temperature detecting means for detecting temperature of a brake pad; second prohibit means for setting said traction control means to an operation permit mode when the pad temperature is below a first predetermined temperature, and setting the traction control means to an operation prohibited mode when the pad temperature is above a second predetermined temperature.

The traction control permit/prohibit determination apparatus according to the present invention continuously monitors the vehicle speed, and in principle prohibits traction control when the vehicle speed is determined to be within the intermediate speed range or high speed range.

If traction control is applied in the low speed range and remains continuously applied as the vehicle speed increases to within the intermediate speed range, however, traction control is maintained until the traction control cycle ends. Traction control is also enabled when the vehicle speed is in the intermediate speed range, wheel spinning is newly detected, and the vehicle speed also drops.

The traction control permit/prohibit determination apparatus according to the present invention also detects the brake pad temperature in addition to the vehicle speed. When the brake pad temperature reaches what is determined to be an abnormal temperature, traction control is prohibited and cannot be resumed for a predetermined period thereafter, thus allowing the brake pad temperature to drop.

BRIEF DESCRIPTION OF THE DRAWINGS

The present invention will become more fully understood from the detailed description given below and the accompanying diagrams wherein.

DETAILED DESCRIPTION OF THE PREFERRED EMBODIMENT

Figure 1:
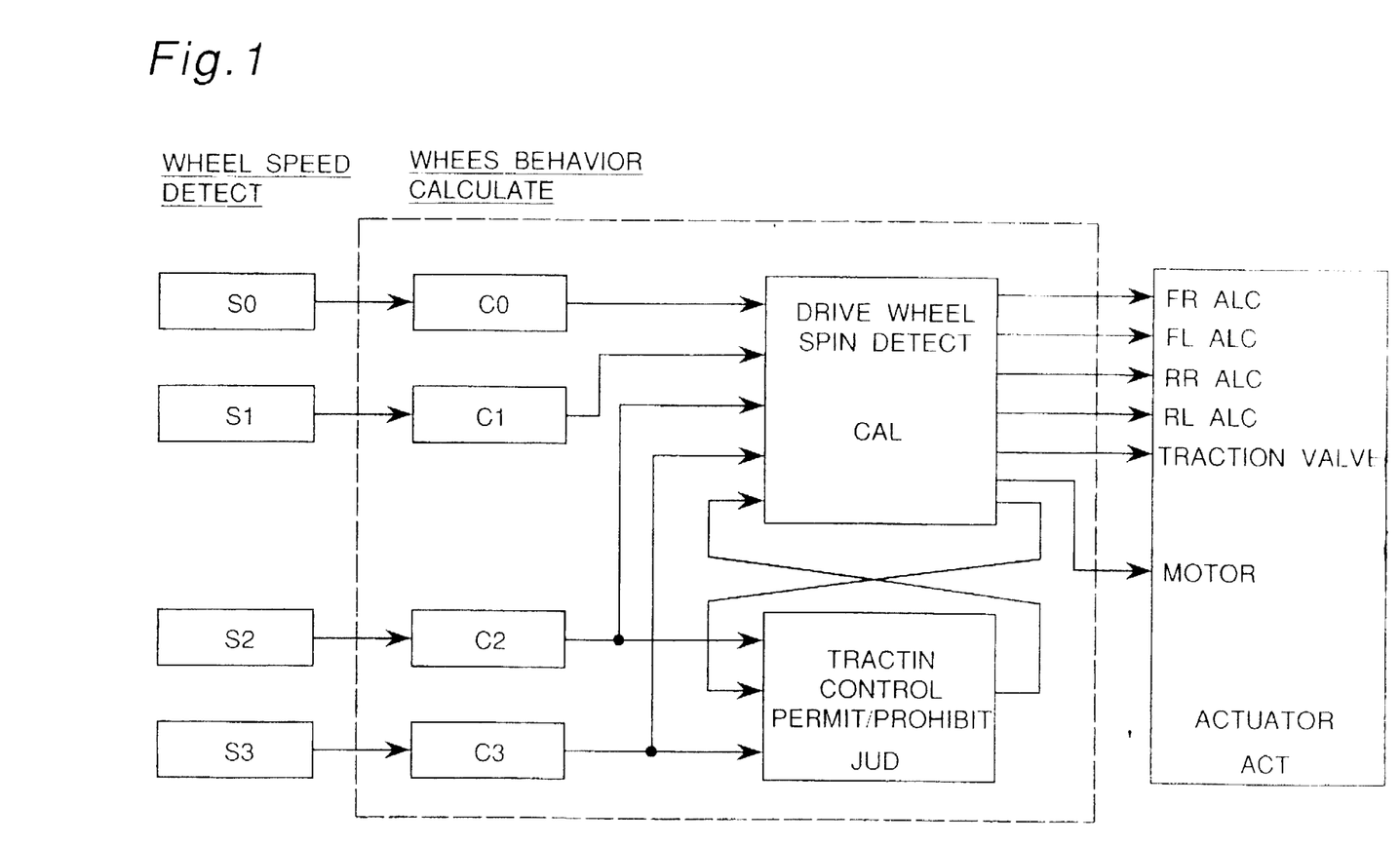
FIG. 1 is a block diagram of a traction control permit/prohibit determination apparatus according to the present invention.

The preferred embodiment of a traction control permit/ prohibit determination apparatus according to the present invention is described hereinbelow with reference to the accompanying figures, of which FIG. 1 is a block diagram of the traction control permit/prohibit determination apparatus. As shown in FIG. 1, the traction control permit/ prohibit determination apparatus comprises wheel speed detectors S0–S3 and wheel behavior calculation means C0–C3 (where numbers 0, 1, 2, and 3 indicate the right front, left front, right rear, and left rear wheels, respectively), a drive wheel spin detector CAL, a traction control permit/ prohibit determination means JUD, and an actuator ACT.

It is to be noted that the components enclosed by the dotted line in FIG. 1 can be achieved in a microcomputer. In addition, the traction control permit/prohibit determination means according to the invention is described below with specific reference to use on a front-wheel drive vehicle, but it will be known by those skilled in the art that the invention can also be applied on other types of vehicles.

Figure 2:
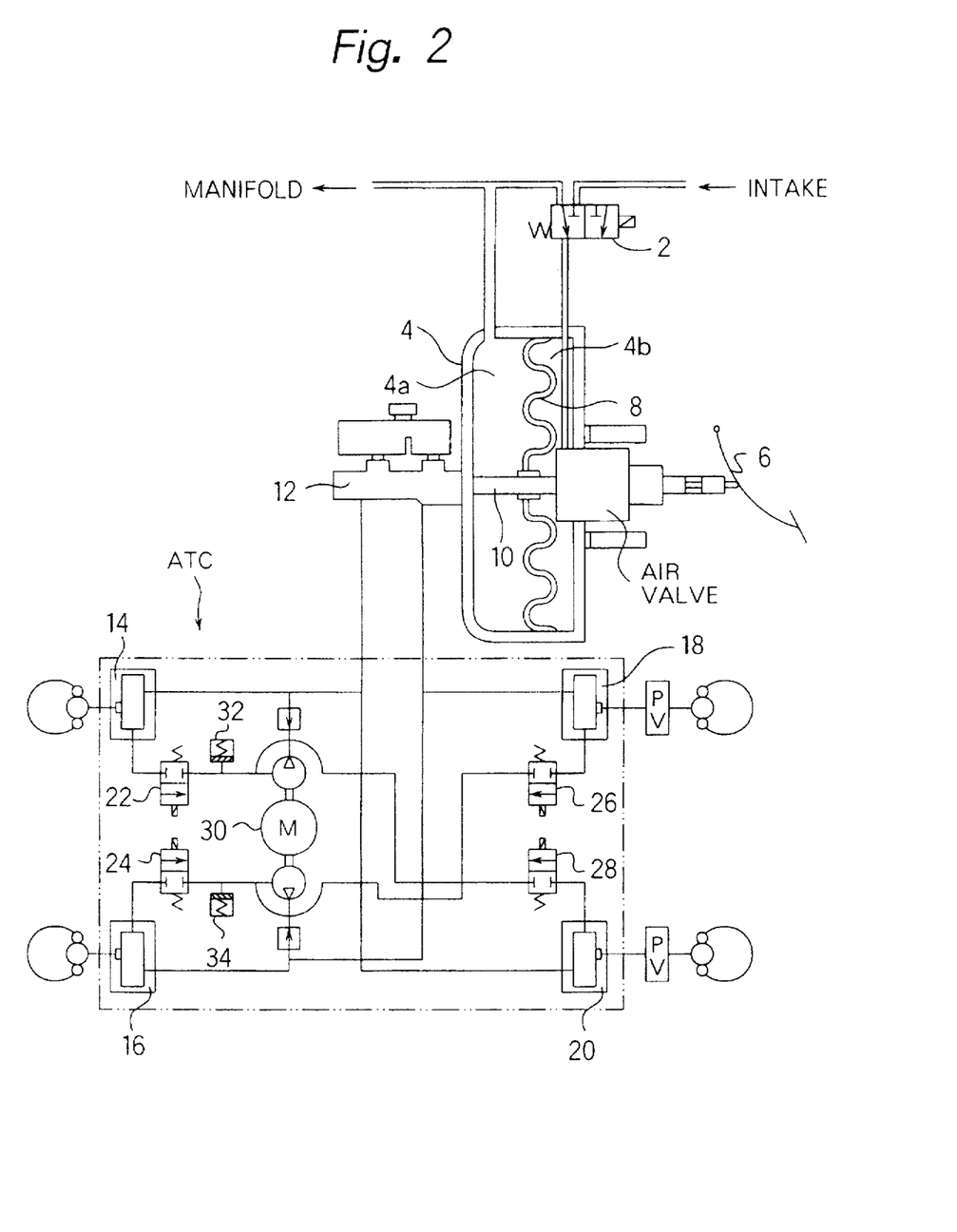
FIG. 2 is a diagram of the actuator used in the brake system.

The actuator ACT shown in FIG. 2 can be used for both antilock brake control and traction control. Shown in FIG. 2 are the traction valve 2, a vacuum booster 4 divided into two chambers 4a and 4b by a diaphragm 8, the brake pedal 6 and connected piston rod 10, master cylinder 12, the lines by which the fluid pressure from the master cylinder 12 is distributed to the four brake control valves 14, 16, 18, and 20, antilock control valves 22, 24, 26, and 28, buffer chambers 32 and 34, and a motor pump 30.

The operation of this actuator ACT during traction control is described below. It is assumed that the right front (the drive wheel for which brake control valve 14 is provided) wheel is spinning.

When an over-spinning (a spin greater than a predetermined spin) of the right front wheel is detected, the traction valve 2 is switched from closed (position shown in FIG. 2) to open, the antilock control valve 22 is held closed (position shown in FIG. 2), the other antilock control valves 24, 26, and 28 are switched open, and the motor pump 30 is driven. This introduces air from the intake to the one chamber 4b. The air moves the diaphragm 8, which causes the piston rod 10 to shift, thus pressurizing the master cylinder 12 and increasing the brake pressure. Because the antilock control valve 22 is closed, the traction brake pressure is generated at the brake control valve 14, thus causing the brakes to be applied to the spinning right front wheel and the spinning to be suppressed. The traction brake pressure is not generated at the other wheels, however, because the other antilock control valves 24, 26, and 28 are open. For more efficient traction control, the antilock control valve 22 is normally switched repeatedly on and off for brief periods.

The method of achieving traction control as thus described is essentially the same as other known methods. What distinguishes the present invention is determining according to the present conditions whether or not traction control can be applied, and actually applying traction control only when traction control is determined acceptable. There are two major determination standards: determination based on the vehicle speed, and determination based on the brake pad temperature. These two determination standards are described below.

Simple experience demonstrates that traction control as a means of assisting the start of vehicle travel is really only required at low speeds. It is therefore possible to determine whether traction control can be applied based on the vehicle speed. Essentially, traction control is made possible when the vehicle speed is within a predetermined low speed range, e.g., less than 10 km/hr (VREF<10), and is prohibited when the vehicle speed is in a high speed range, e.g., greater than or equal to 40 km/hr (VREF≧40). When the vehicle speed is in an intermediate speed range, defined herein as greater than or equal to the low speed range upper limit (10 km/hr) and less than the high speed range lower limit (40 km/hr), traction control is allowed to continue if it is already being applied when the vehicle speed increases from the low speed range to the intermediate speed range, but if traction control is not being applied when the vehicle speed increases from the low speed range to the intermediate speed range, starting a new traction control cycle is prohibited.

There is one exception to this intermediate speed range traction control prohibition. Specifically, if spinning is newly detected and the vehicle speed decreases when the vehicle speed is in the intermediate speed range, traction control is enabled even if traction control is not being continuously applied from the low speed range. What this does is permit traction control to be restarted when a moving vehicle begins to climb a hill or encounters snow or other conditions significantly reducing the friction coefficient (μ) of the road surface, and the vehicle speed drops despite the accelerator being pressed.

As will be described in detail below, a VSPFLAG is cleared to zero (0) to enable traction control and set to one (1) to prohibit traction control.

The device according to the present invention also estimates the temperature level of the brake pads to enable traction control when the estimated temperature level is less than a threshold value, prohibits traction control when the estimated temperature level reaches this threshold value, and keeps the prohibit flag set for a predetermined period thereafter. More specifically, the brake pad temperature can be assumed to rise during the period in which the traction brake pressure is being output. By counting the duration of this period, the pad temperature level can be estimated from the sum of the counted period(s). Traction control is prohibited when the total time reaches a predetermined upper limit. The brake pad temperature can also be assumed to drop when the traction brake pressure is not being output, and the counter is therefore counted down during this period. Once the counter reaches the trigger threshold and traction control is prohibited, traction control remains prohibited until the count drops to below a predetermined lower limit. In the preferred embodiment of the invention, the period during which the traction brake pressure is output is counted, traction control is prohibited when the counted period exceeds approximately 20 seconds, and traction control remains prohibited for approximately 80 seconds thereafter.

Measures have also been taken in the invention to reduce the discomforting sounds that can be heard from the motor pump during traction control. Referring to FIG. 2, when traction control begins the traction valve 2 opens, the antilock control valves 26, 28 for at least the non-driven wheels are opened, and the motor pump 30 continues operating. Driving the motor pump 30, however, increases battery current consumption and generates a noticeable noise that can be discomfiting to the driver and is not desirable in a vehicle. As a result, the present invention closes the traction valve 2 and stops the motor pump 30 when the driver has no intent to start or accelerate the vehicle. Examples of this lack of intent are when the foot is off the accelerator pedal, and when the gears are being shifted up.

The traction control permit/prohibit determination process of the invention is described below with reference to the accompanying flow charts in FIGS. 3–8.

Figure 3:
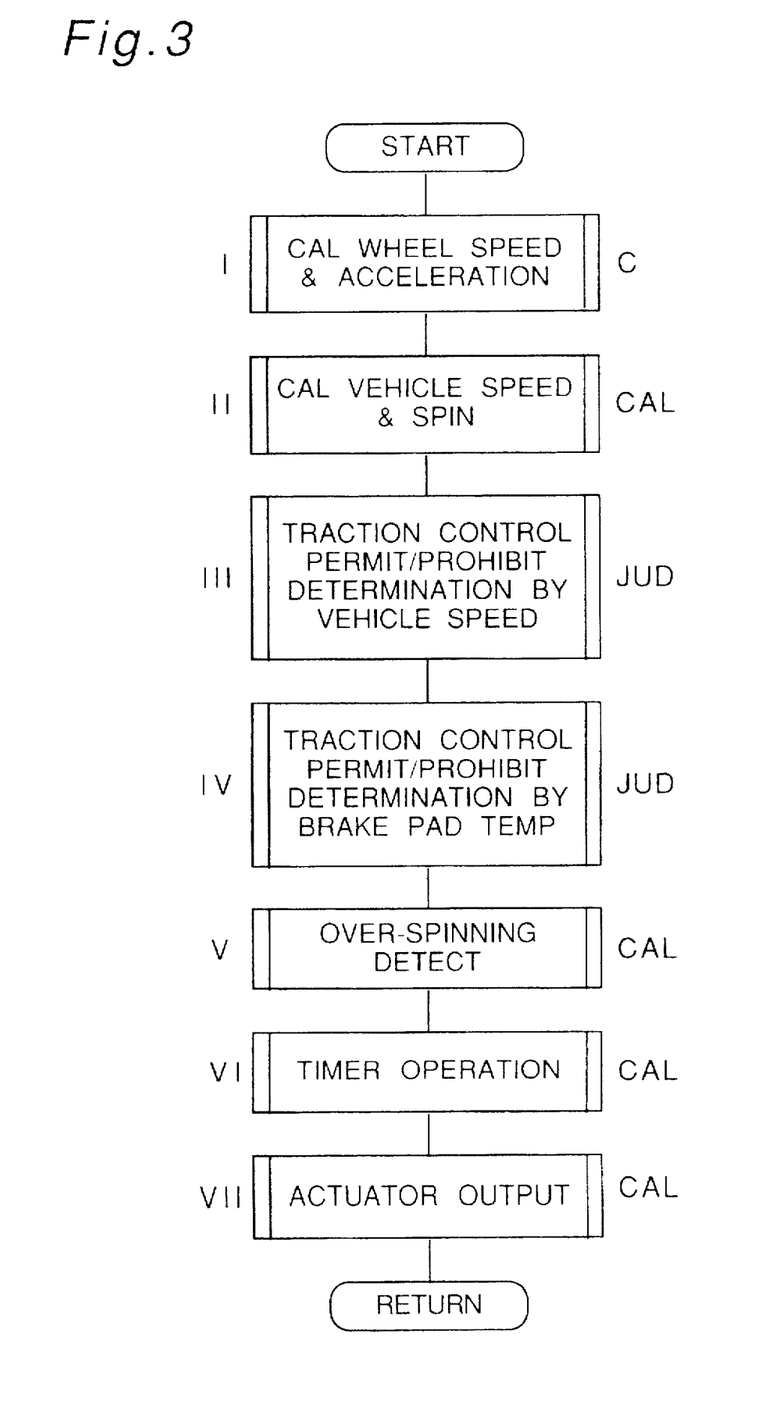
FIG. 3 is a flow chart of the traction control permit/prohibit determination process.

FIG. 3 is a flow chart of the overall control process where one cycle comprises subroutines I–VII, and the subroutines I–VII are sequentially executed in each cycle.

The wheel speed and wheel acceleration are obtained in the first subroutine I. These values are then processed by a known estimation method in subroutine II to calculate the vehicle speed VREF, and to calculate the amount of wheel spin using the following equations.

$$SPIN0=SPD0-SPD2$$

$$SPIN1=SPD1-SPD3$$

It is determined whether traction control is to be enabled or prohibited based on the vehicle speed in subroutine III, and based on the estimated temperature level of the brake pad(s) in subroutine IV. Whether any of the wheels are spinning excessively (over-spinning) is determined in subroutine V. The traction flag TFLAG used to regulate traction brake pressure output is set in subroutine VI, and a timer that counts the period during which tire spinning is presumed to stop after traction control begins is operated. The last subroutine VII operates the actuator ACT by outputting signals controlling the traction valve 2, opening/closing the antilock control valves 22, 24, 26, 28, and on/off operation of the motor pump 30.

Subroutines III–VII are described in detail below using the accompanying flow charts.

Figure 4:
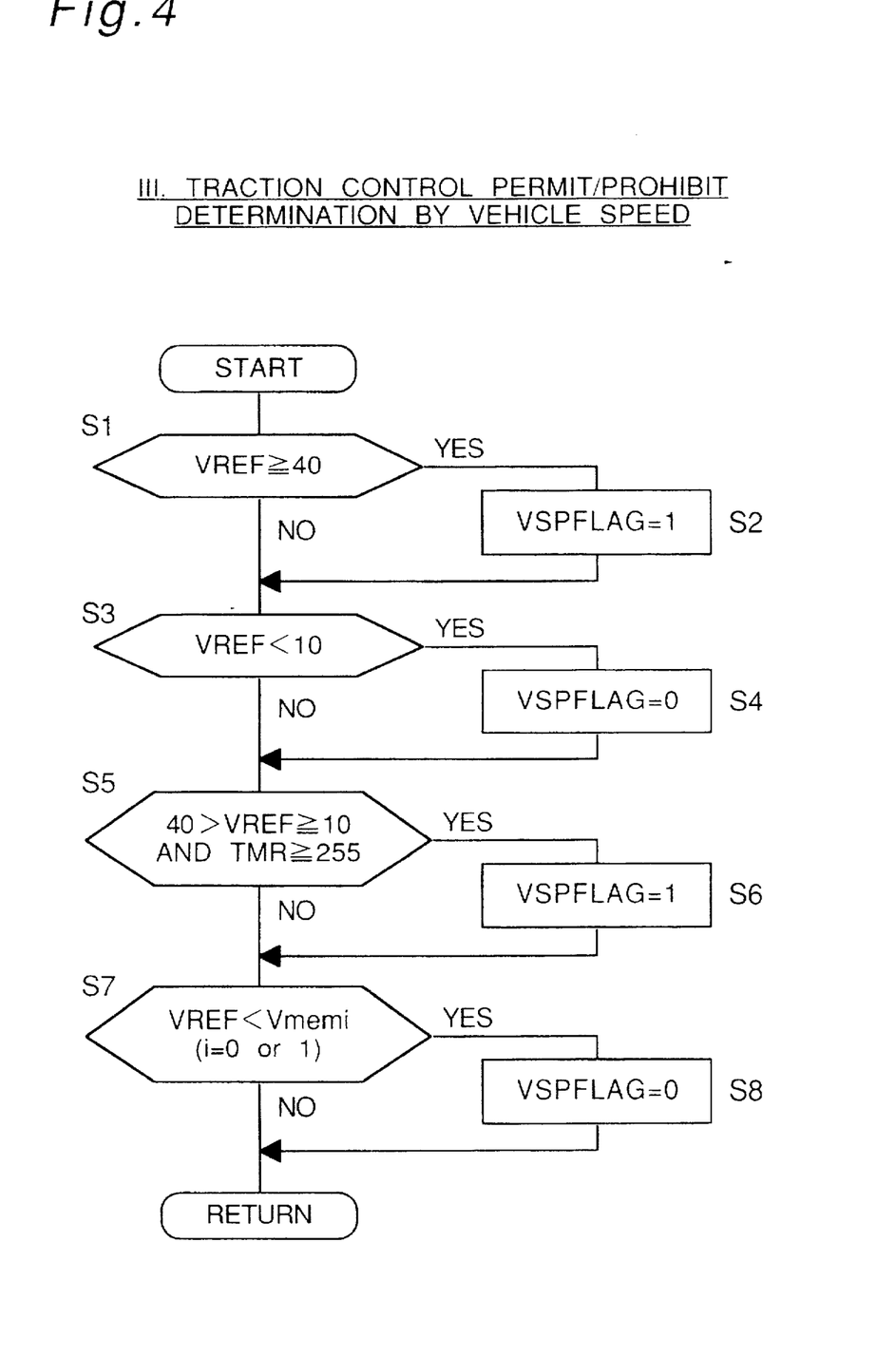
FIG. 4 is a flow chart of subroutine III in FIG. 3.

FIG. 4 is a flow chart of subroutine III, i.e., the wheel speed-based traction control determination.

The first step S1 determines whether the vehicle speed VREF is greater than or equal to 40 km/hr. If it is, the vehicle speed flag VSPFLAG is set to 1 at step S2, thus indicating that traction control is to be prohibited. If the vehicle speed VREF is less than 40 km/hr, it is compared with the lower threshold value (10 km/hr) in step S3. If the vehicle speed VREF is less than 10 km/hr, the flag VSPFLAG is cleared to zero (0) at step S4 to permit or enable traction control.

If at step S5 the vehicle speed VREF is less than 40 km/hr but greater than or equal to 10 km/hr, i.e., between the upper and lower threshold values, and the traction timer TMR is greater than or equal to the upper threshold value (255), the flag VSPFLAG is again set (=1) at step S6. These two steps (steps S5 and S6) basically determine that the vehicle speed has entered the intermediate speed range.

If traction control is started while the vehicle speed is less than 10 km/hr, traction control is continued in the intermediate speed range, but after this control cycle is completed, traction control cannot be started again.

At step S7 the vehicle speed VREF is compared with the vehicle speed Vmemi stored in a previous cycle. If VREF< Vmemi, the flag VSPFLAG is cleared (=0) at step S8 to enable traction control. These two steps (steps S7 and S8) thus determine whether the vehicle speed has dropped even though the accelerator is depressed and the vehicle speed is in the intermediate speed range, and traction control is enabled if the vehicle speed is determined to drop under these conditions.

Figure 5:
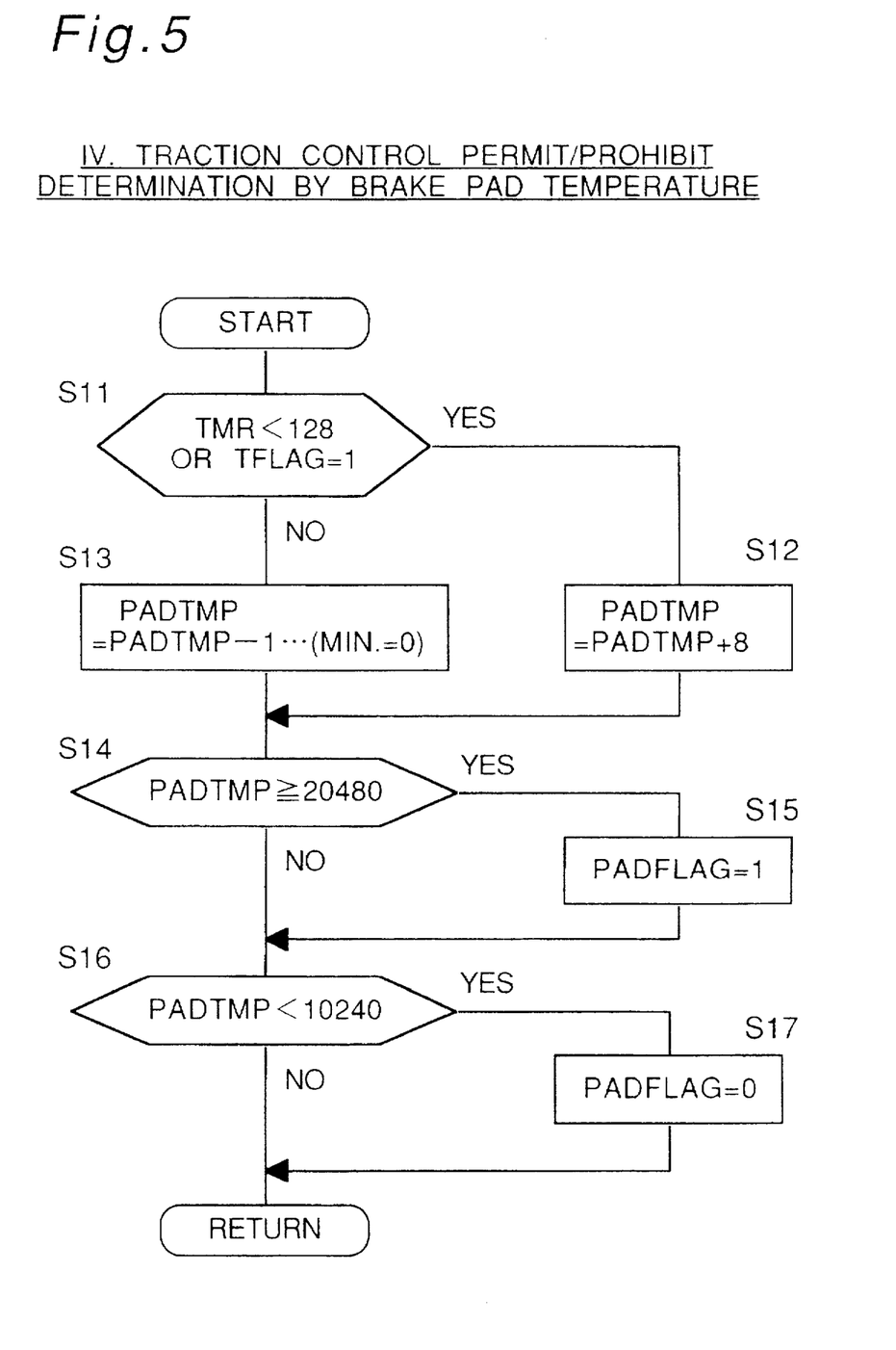
FIG. 5 is a flow chart of subroutine IV in FIG. 3.

FIG. 5 is a flow chart of subroutine IV, i.e., the traction control determination based on the estimated brake pad temperature level.

Two tests are performed at step S11: whether the traction timer TMR is less than a median value (128), and whether the traction flag TFLAG is set (=1). If either condition is true, the counter PADTMP expressing the brake pad temperature level is incremented by eight (step S12). The counter PADTMP has been initialized to zero when the ignition is first turned on. If neither of these conditions is true, the counter PADTMP is counted down by one (except when the counter PADTMP value is zero, in which case the zero value is held).

After conditionally changing the counter PADTMP in step S13 or S12 as above, the counter PADTMP is compared with an upper threshold value (20480) in step S14. If the counter is greater than or equal to the threshold value, the pad temperature flag PADFLAG is set (=1) at step S15, indicating that traction control is to be prohibited. The counter PADTMP is then compared with a lower threshold value (10240) in step S16. If the counter is less than this lower limit, the pad temperature flag PADFLAG is cleared (=0) at step S17, thus enabling traction control.

If the control cycle is completed in 8 msec, step S14 can determine that the traction brake pressure has been applied for 20 seconds, and the flag PADFLAG (=1) can then be set in step S15. Step S16 determines whether the counter PADTMP has been counted down to less than half (10240) the upper threshold value (20480). Since the counter PADTMP is counted down at ⅛ the rate of increase, step S16 holds the pad temperature flag PADFLAG set to prohibit traction control for up to approximately 80 seconds while the counter PADTMP is counting down. After 80 seconds, the pad temperature flag PADFLAG is cleared (=0) and traction control is again enabled.

Figure 6:
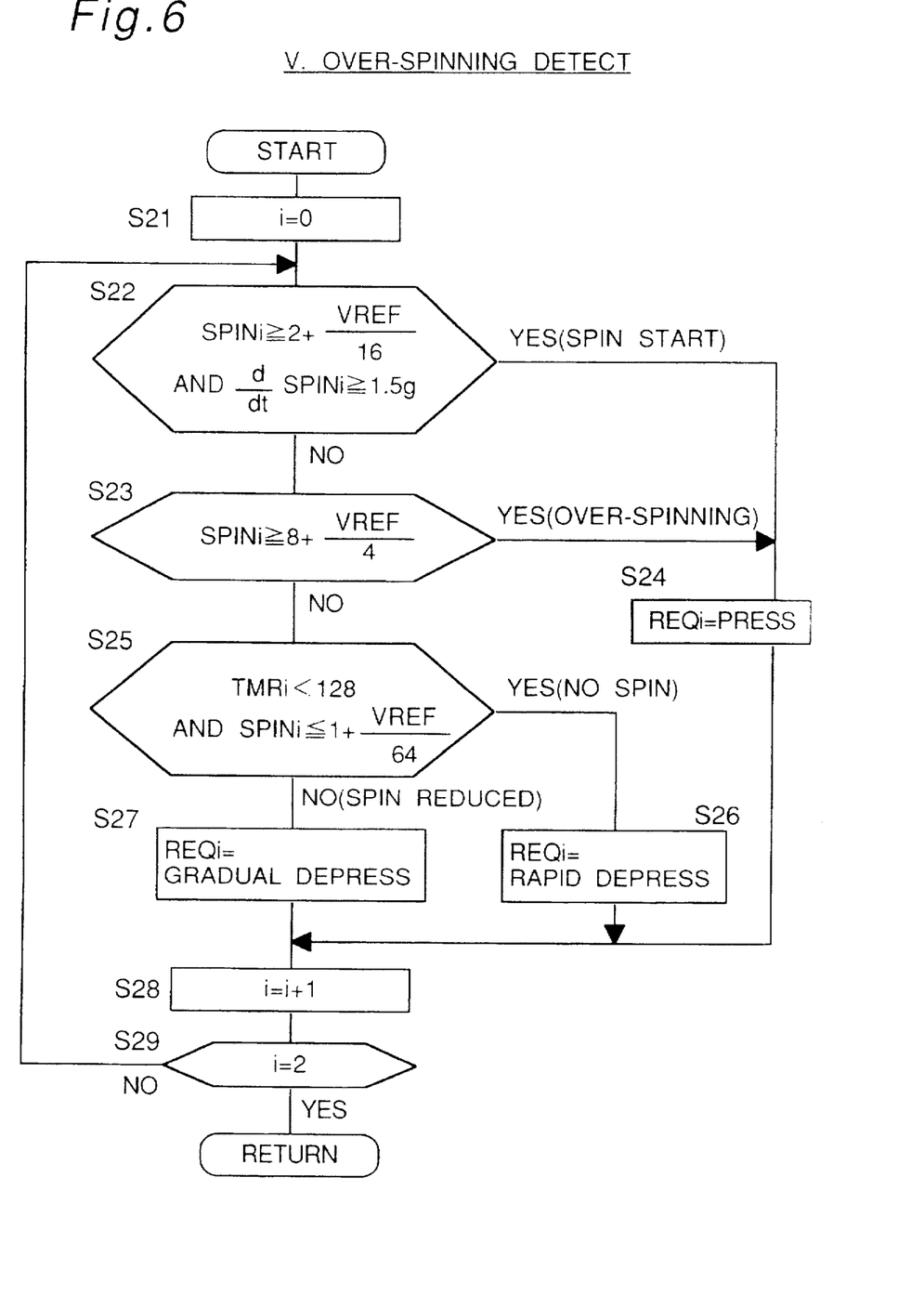
FIG. 6 is a flow chart of subroutine V in FIG. 3.

FIG. 6 is a flow chart of subroutine V, i.e., the over-spinning detection.

This subroutine starts by resetting the counter i to zero at step S21, and then tests two conditions at step S22 to determine whether the wheel is spinning. These step S22 tests are whether the amount of wheel spinning SPINi is greater than or equal to [2+ (VREF/16)], and whether the spinning acceleration SPINi is greater than or equal to 1.5 g. If both conditions are true, the wheels are determined to be spinning and the procedure skips to step S24. If either one of the conditions is not true, the procedure advances to step S23 to determine whether the amount of wheel spinning SPINi is greater than or equal to [+ (VREF/4)]. If it is, the wheels are determined to be spinning excessively and the procedure skips to step S24.

At step S24 the traction brake pressure control signal REQi is set to pressurize in order to suppress the wheel spinning.

If both steps S22 and S23 return FALSE, it is determined in step S25 whether the traction timer TMR is less than a median value (128), and whether the amount of wheel spinning SPINi is less than ([1+ (VREF/64)]. If both conditions are met it is concluded that there is absolutely no wheel spinning, and the traction brake pressure control signal REQi is set to the rapid depressurization command (step S26).

If one of the conditions in step S25 is not met, however, it can be concluded that the amount of spinning is dropping, and the traction brake pressure control signal REQi is therefore set to a gradual depressurization command (step S27).

The counter i is incremented at step S28, and then compared with the constant 2 at step S29. If i is only 1, the process loops back to step S22, otherwise it returns to the main routine. Specifically, steps S28 and S29 restrict execution of this subroutine to the front drive wheels in this embodiment.

Figure 7:
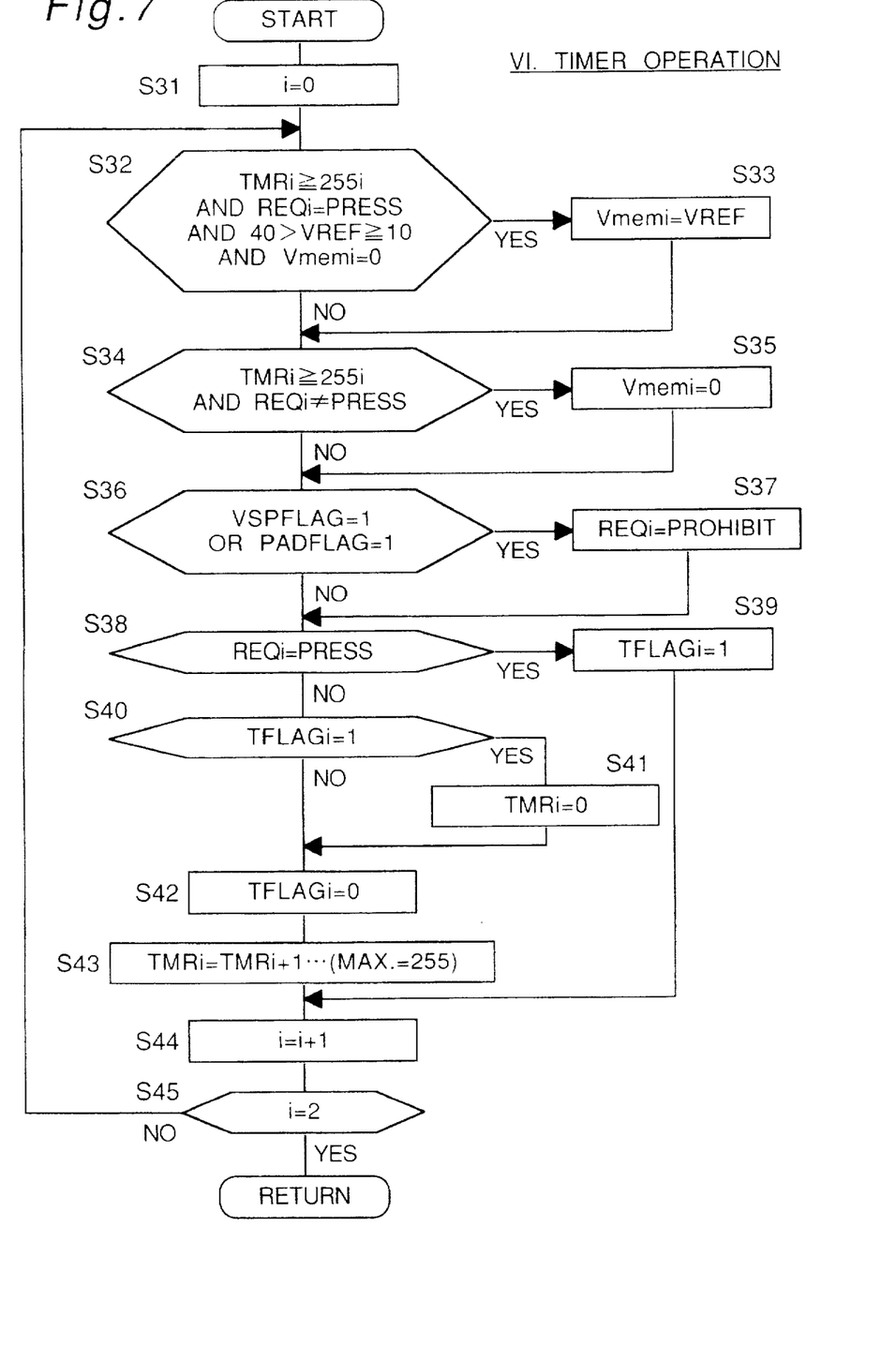
FIG. 7 is a flow chart of subroutine VI in FIG. 3.

FIG. 7 is a flow chart of subroutine VI, i.e., the timer operation subroutine.

This subroutine also starts by initializing the internal wheel counter i to zero (step S31). Four determinations are then performed at step S32: whether the traction timer TMR is greater than or equal to the upper threshold (255), whether the traction brake pressure control signal REQi is set to pressurize, whether the vehicle speed VREF is in the intermediate speed range, and whether the vehicle speed memory vmemi (which stores the vehicle speed when spinning is first detected) is cleared (=0). If all four conditions are met, the vehicle speed VREF of the current cycle is written to the vehicle speed memory Vmemi (step S33). Thus, if the vehicle is travelling in the intermediate speed range, traction control is not active, spinning is newly detected, and a traction braking request (REQi=pressurize) is output, the current vehicle speed VREF is written to the vehicle speed memory Vmemi (steps S32 and S33).

Whether the traction timer TMRi is greater than or equal to the upper threshold (255), and whether the traction brake pressure control signal REQi is set to a value other than "pressurize," are determined at step S34. If both conditions are true, the vehicle speed memory Vmemi is cleared (=0) at step S35.

The vehicle speed flag VSPFLAG and the pad temperature flag PADFLAG are checked in step S36. If either flag is set (=1), the traction brake pressure control signal REQi is set to PROHIBIT (step S37).

Whether the traction brake pressure control signal REQi is set to pressurize is checked in step S38. If it is, the traction flag TFLAGi is set (=1) in step S39.

The traction flag TFLAGi state is checked in step S40. If the traction flag TFLAG is set (=1), the traction timer TMRi is cleared (=0) at step S41. The traction flag TFLAGi is reset to 0 at step S42, and the traction timer TMRi is then incremented one at step S43. The traction timer TMRi can be incremented to a maximum of 255, after which the TMRi is held at the maximum value. After traction control stops and the last traction brake pressurize command is applied, the traction timer TMRi is counted up from zero to a maximum 255, at which point the traction timer TMRi causes traction control to terminate.

The counter i is incremented at step S44, and then compared with the constant 2 at step S45. If i is only 1, the process loops back to step S32, otherwise it returns to the main routine.

Figure 8:
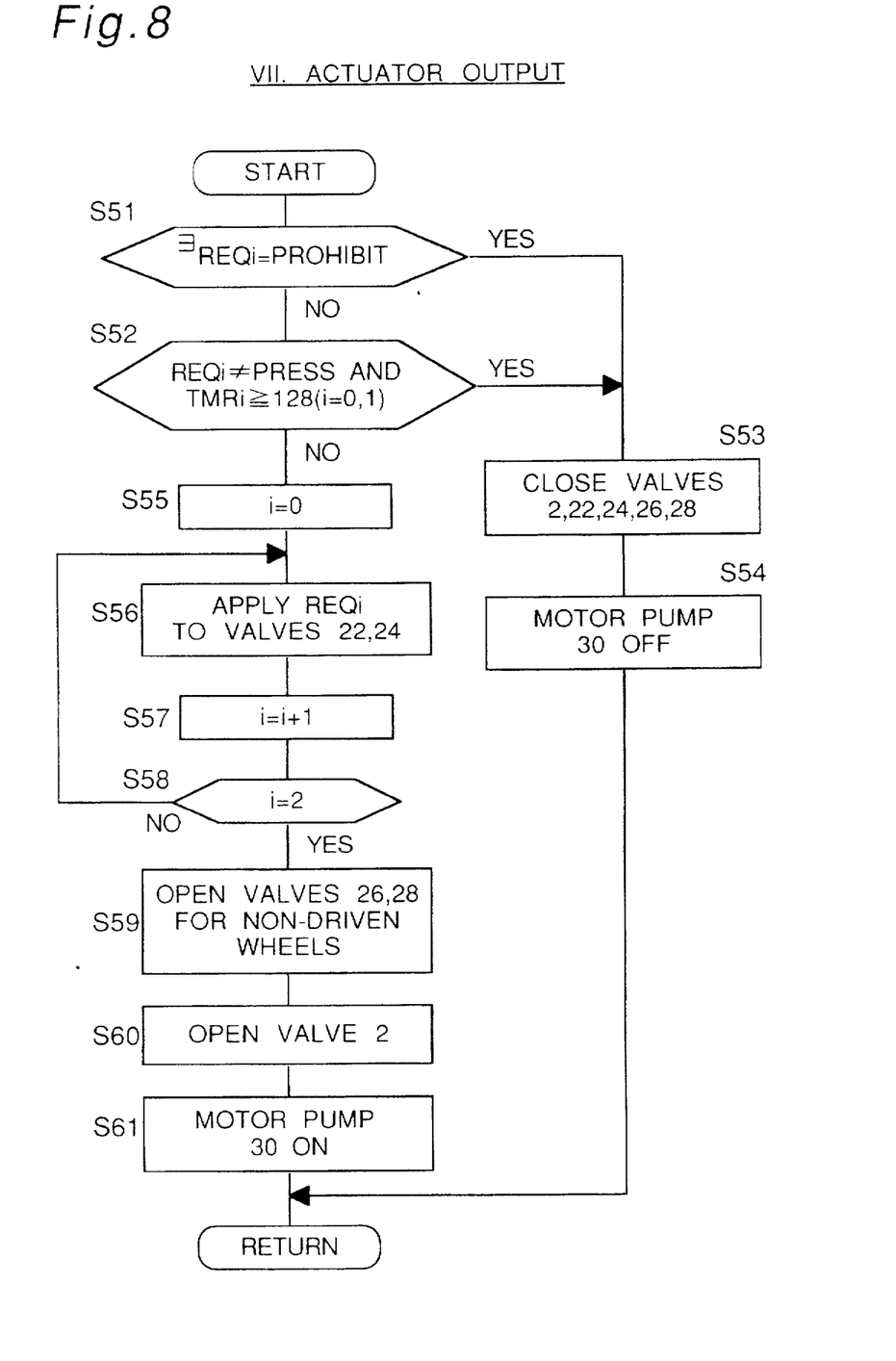
FIG. 8 is a flow chart of subroutine VII in FIG. 3.

FIG. 8 is a flow chart of subroutine VII, i.e., the actuator output subroutine.

This subroutine first determines whether traction brake pressure control signal REQ0 or REQ1 is set to the PROHIBIT command. If either REQ0 or REQ1 is set to PROHIBIT, control skips to step S53.

If neither REQ0 or REQ1 is set to PROHIBIT, it is determined whether the traction brake pressure control signal REQi is set to a value other than pressurize, and whether the traction timer TMRi is greater than or equal to a median value (128). If both conditions are met, control skips to step S53. In other words, steps S51 and S52 determine whether traction control is interrupted or ended. If either is true, the traction valve 2 is closed and all antilock control valves 22, 24, 26, 28 are closed (step S53), and the motor pump 30 is turned off (step S54).

When traction control is in progress, the counter i is set to 0 at step S55, and the traction brake pressure control signal REQi command is output to the antilock control valves 22, 24 at step S56. The counter i is then incremented at step S57, and then compared with the constant 2 at step S58. If i is only 1, the process loops back to step S56, otherwise it advances to step S59. The antilock control valves 26, 28 for the non-driven wheels are opened at step S59, and the traction valve 2 is then opened at step S60. The motor pump 30 is also turned on (step S61).

The operation of the traction control permit/prohibit determination apparatus according to the present invention is described below.

When the vehicle speed VREF is less than 10 km/hr, the vehicle speed flag VSPFLAG is set to 0 in steps S3 and S4, thus preventing the procedure from advancing from step S36 to step S37. The traction brake pressure control signal REQi is therefore not set to PROHIBIT, and the commands set in steps S22–S27 are executed in step S56.

When the vehicle speed VREF is greater than or equal to 40 km/hr, the vehicle speed flag VSPFLAG is set (=1) in steps S1 and S2. This causes the timer operation subroutine to move from step S36 to S37 and set the traction brake pressure control signal REQi to PROHIBIT. The commands set in steps S22–S27 are therefore ignored, steps S53 and S54 are executed, and the actuator subroutine then returns to the main routine.

When the vehicle speed VREF is in the intermediate speed range, i.e., greater than or equal to 10 km/hr and less than 40 km/hr, the vehicle speed could have decelerated from the high speed range or accelerated from the low speed range into the intermediate speed range.

If the vehicle has decelerated into the intermediate speed range, it is not possible for traction control to be in progress, and the traction timer TMR is therefore held equal to 255. The traction control determination subroutine (FIG. 4) therefore proceeds to steps S5 and S6, and the vehicle speed flag VSPFLAG is set (=1).

When the vehicle accelerates into the intermediate speed range, however, traction control may or may not be in progress.

When traction control is in progress when the vehicle accelerates from the low to the intermediate speed range, step S5 will return NO, as will steps S1, S3, and S7. The vehicle speed flag VSPFLAG setting from the previous cycle is therefore used. Steps S3 and S4 should have been executed in the previous cycle, however, and the VSPFLAG=0 state is therefore retained. As a result, step S37 is not executed and the PROHIBIT command is not output.

When traction control is not in progress when the vehicle accelerates from the low to the intermediate speed range, steps S5 and S6 cause the flag VSPFLAG to be set (=1). Step S36 thus returns YES, step S37 sets the traction brake pressure control signal REQi to PROHIBIT, and the PROHIBIT command is output.

Figure 10:
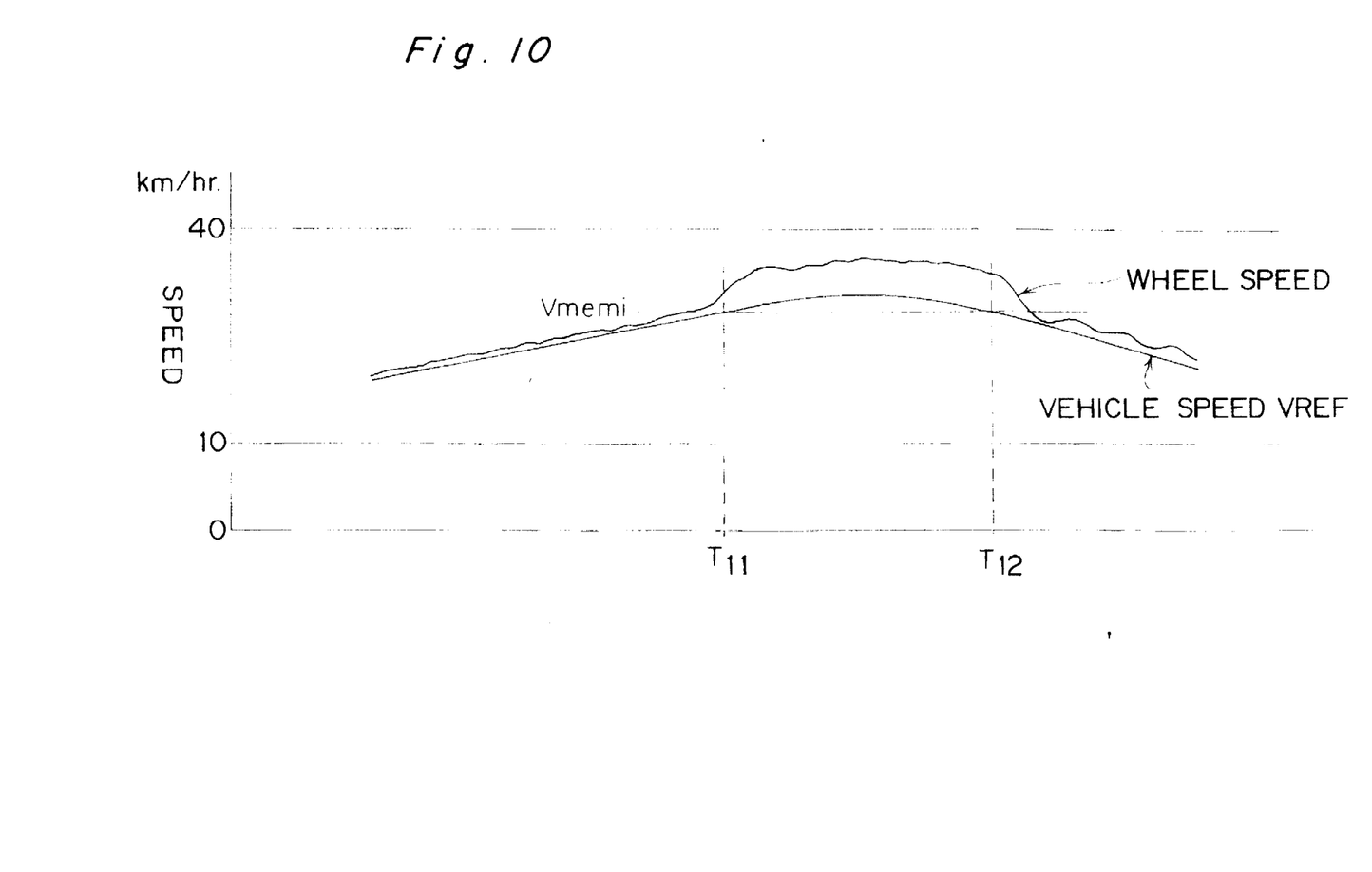
FIG. 10 is a graph of a traction control permit/prohibit determination apparatus operation when spinning is detected in the intermediate speed range.

If the vehicle speed VREF slows down (time T12) even though the accelerator is depressed because of new spinning (time T11) when in the intermediate speed range (see FIG. 10), this spinning will be detected at either step S22 or S23. Step S32 thus returns YES and the current vehicle speed VREF is written to the vehicle speed memory Vmemi at step S33. If vehicle speed deceleration is again detected at step S7 in the next cycle (time T12), the flag VSPFLAG is cleared (=0) at step S8. As a result, if a pressurize command is output for the traction brake pressure control signal REQi at step S24, step S36 returns NO, step S37 is bypassed, and S55–S61 are executed.

When traction control starts and the traction timer TMR has counted up to the median value (128), and when TMR≧

128 but TFLAG=1, traction control has probably been frequently applied. Under these conditions steps S11 and S12 are always executed, and the counter PADTMP used to monitor the increase in the brake pad temperature increases. Note that the "TFLAG=1" state is true until the traction timer TMR is cleared again once traction control starts. Thus, when the pad temperature flag PADFLAG, which is used to monitor the brake pad temperature, exceeds an upper threshold value (20480 in this embodiment), the PADFLAG is set to 1 in step S15. This causes the PROHIBIT traction brake pressure control signal REQi to be output at steps S36 and S37 even if a PRESSURIZE traction brake pressure control signal REQi is output at step S24. At step S42 the TFLAG is cleared (=0), and steps S51, S53, and S54 are executed. As a result, when the brake pad temperature can be assumed to be very high, traction control is unconditionally cut off.

Once traction control has been interrupted, step S13 is repeatedly executed and the counter PADTMP is slowly counted down. When the counter PADTMP finally declines to less than a predetermined threshold value (10240 in this embodiment), step S17 is executed and the pad temperature flag PADFLAG is cleared (=0), thus re-enabling traction control.

Figure 9:
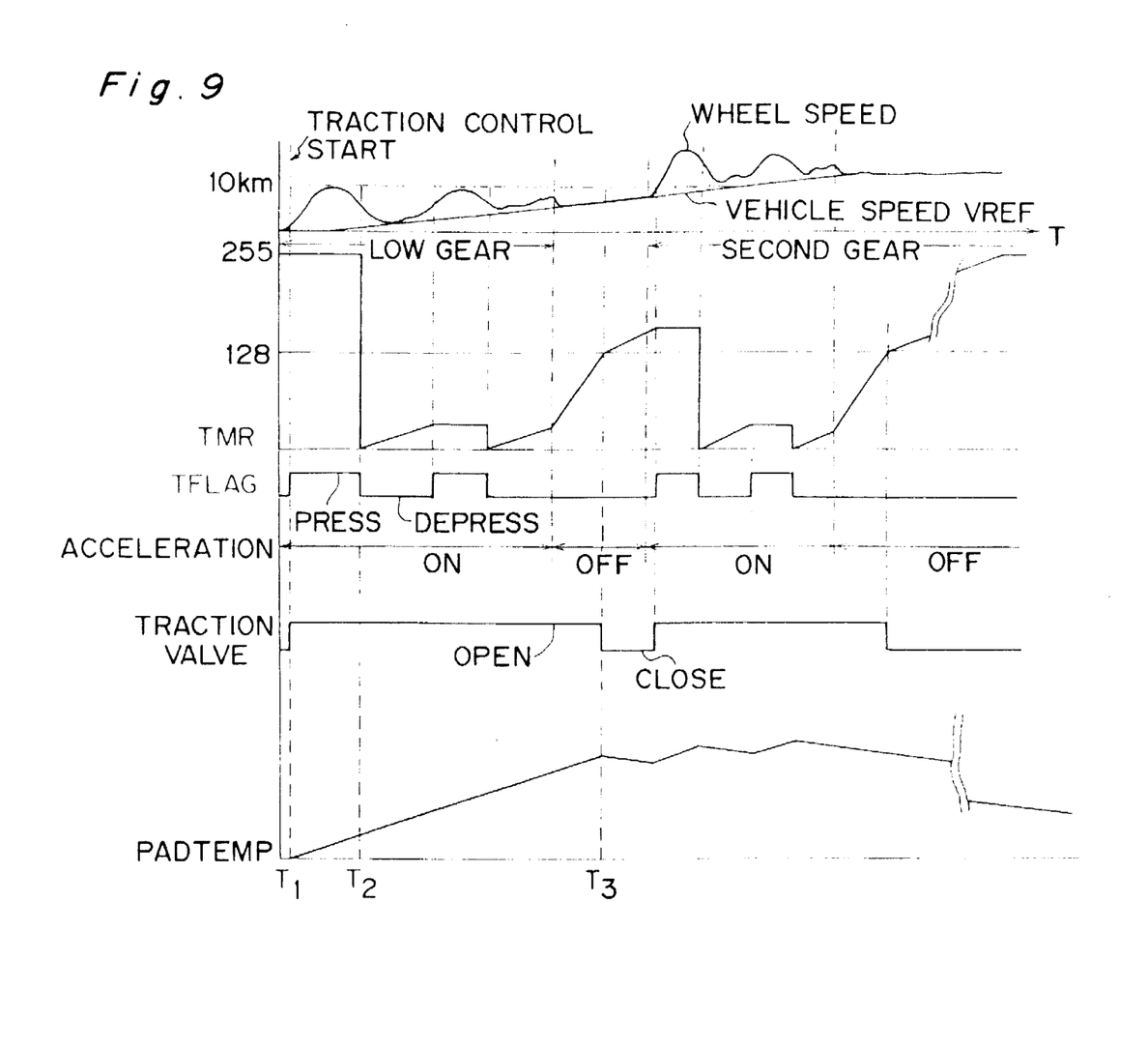
FIG. 9 is a graph of a traction control permit/prohibit determination apparatus operation when spinning is detected in the low speed range.

The operation of the invention when the vehicle starts moving is described below with reference to FIG. 9.

Time T1 is the point at which spinning is first detected after the vehicle begins moving. The control steps and returned values at time T1 are shown in Table 1 below.

TABLE 1

| Subroutine | Steps executed | Results |
| --- | --- | --- |
| III | S1, S3, S4, S5, S7 | VSPFLAG = 0 |
| IV | S11, S13, S14, S16, S17 | PADTMP = 0 |
| | | PADFLAG = 0 |
| V | S22, S24 | REQ = pressurize |
| VI | S32, S34, S36, S38, S39 | TFLAG = 1 |
| VII | S51, S52, S55–S58, S59–S61 | REQ = pressurize (traction brake is pressurized at traction control start) |

The vehicle speed flag VSPFLAG is set to 0 at step S4, the PTMP counter is held to the minimum value (0) at step S13, and the PADFLAG is set to 0 at step S17. REQ=pressurize is returned as a result of steps S22 and S24, TFLAG= 1 is returned by steps S38 and S39, and the traction brake pressure is applied and traction control is accomplished based on the REQi= PRESSURIZE state as a result of steps S55–S61.

After time T1, steps S11 and S12 are executed, and the brake pad temperature counter PADTMP is incremented. The rest of the procedure between T1 and T2 is the same as that described at time T1 above.

At time T2 the spinning is settled. The control steps and returned values at time T2 are shown in Table 2 below.

TABLE 2

| Subroutine | Steps executed | Results |
| --- | --- | --- |
| III | S1, S3, S4, S5, S7 | VSPFLAG = 0 |
| IV | S11, S12, S14, S16, S17 | PADTMP incremented |
| | | PADFLAG = 0 |
| V | S22, S23, S25, S27 | REQ = slowly depressurize |
| VI | S32, S34, S36, S38, S40, S41, S42 | TMR = 0 |
| | | TFLAG = 0 |

TABLE 2-continued

| Subroutine | Steps executed | Results |
| --- | --- | --- |
| VII | S43 S51, S52, S55–S58, S59–S61 | TMR incremented REQ = slowly depressurize output (traction brakes depressurized during traction control) |

The vehicle speed flag VSPFLAG is set to 0 at step S4, the PADTMP counter is incremented at step S12, the PADFLAG is set to 0 at step S17, and the traction brake pressure control signal REQi is set to slowly reduce the brake pressure at step S27. As a result of steps S40, S41, S42, and S43, the traction timer TMR is cleared (=0), the traction flag TFLAG is cleared (=0), and the traction timer TMR is incremented. The traction control brake pressure is slowly reduced at steps S55 and S58 and traction control is maintained.

It is to be noted that spinning cannot occur when the accelerator is released because there is no drive power being delivered. Though not shown in the flow charts, this makes it possible to increase the rate of incrementing the traction timer TMR so that the median value (128) and the upper limit (255) are reached more quickly. As a result, the median value (128) is quickly reached, the traction valve 2 is closed, and undesirable noise from the motor pump 30 can be stopped.

The traction timer TMR has reached the median value (128) at time T3. The control steps and returned values at time T3 are shown in Table 3 below.

TABLE 3

| Subroutine | Steps executed | Results |
| --- | --- | --- |
| III | S1, S3, S4, S5, S7 | VSPFLAG = 0 |
| IV | S11, S12, S14, S16, S17 | PADFLAG = 0 |
| V | S22, S23, S25, S26 | REQ = rapidly depressurize |
| VI | S32, S34, S36, S38, S40, S42, S43 | TMR incremented |
| VII | S51, S52, S53, S54 | Traction brakes closed during traction control |

The vehicle speed flag VSPFLAG is set to 0 at step S4, and the PADFLAG is set to 0 at step S17. Because spinning has stopped at this point, step S26 is executed and the traction brake pressure control signal REQi is set to rapidly reduce the brake pressure. The traction timer TMR is incremented at step S43, steps S53 and S54 are executed, and traction control is about to be terminated. In practice, however, the traction timer TMR has not reached the upper threshold value (255) and traction control is technically still in effect. While the accelerator is released and the gears are changed, however, the traction valve 2 is closed and the motor pump 30 is turned off, thereby minimizing any noise and the load on the brake system.

As thus described, the traction control permit/prohibit determination apparatus according to the present invention can determine whether traction control can be safely applied based on the detected vehicle speed, and can thus prevent traction control from beginning in the high speed range, where traction control is never needed, and can minimize the use of traction control in the intermediate speed range, where traction control is rarely required.

In addition, by estimating changes in the brake pad temperature, the traction control permit/prohibit determination apparatus can prohibit traction control when the brake pad temperature is determined to be abnormally high.

As a result, the damage that can occur from unrestricted application of traction control, such as rapid wear of the brake pads and application of excessive torque to the drive system, can be actively prevented.

In addition, the traction control permit/prohibit determination apparatus according to the present invention can also prevent discomforting noise caused by the motor pump when the driver does not intend to start or accelerate because the traction valve can be closed and the motor pump stopped when the accelerator is released.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A traction control permit/prohibit determination apparatus for use in a vehicle having a plurality of wheels including a drive wheel, said apparatus comprising:

wheel speed detection means for detecting a speed of each wheel of the vehicle;

vehicle speed detecting means for detecting a vehicle speed based on the wheel speeds;

wheel spin detecting means for detecting a spinning of the drive wheel;

traction control means for applying a traction control operation, including applying a traction brake pressure to a brake system provided on the drive wheel, when said wheel spin detecting means detects spinning of the drive wheel;

speed range determination means for determining whether the vehicle speed is in a low speed range, an intermediate speed range, or a high speed range; and prohibit means for prohibiting a traction control operation based on the vehicle speed, said prohibit means comprising means for setting said traction control means to an operation permit mode, in which a traction control operation is permitted, when the vehicle speed is in the low speed range, and setting said traction control means to an operation prohibited mode, in which a traction control operation is prohibited, when the vehicle speed is in the high speed range, said prohibit means further comprising means for holding said traction control means in the operation permit mode, when the vehicle speed moves from the low speed range to the intermediate speed range with said traction control means being operated to control the traction of the vehicle.

2. A traction control permit/prohibit determination apparatus according to claim 1, wherein said prohibit means further sets said traction control means to said operation prohibited mode after traction control is completed.

3. A traction control permit/prohibit determination apparatus according to claim 1, wherein said prohibit means further sets said traction control means to said operation prohibited mode, when the vehicle speed moves from the low speed range to the intermediate speed range with said traction control means being not operated to control the traction of the vehicle.

4. A traction control permit/prohibit determination apparatus according to claim 1, wherein said prohibit means further sets said traction control means to said operation permit mode, when spinning is newly detected while the vehicle speed is in the intermediate speed range, and when the vehicle speed is detected as reducing.

5. A traction control permit/prohibit determination apparatus according to claim 1, further comprising means for terminating traction control when an accelerator is released during said traction control.

6. A traction control permit/prohibit determination apparatus according to claim 1, wherein said prohibit means further comprises means for determining whether the traction control operation was in progress when the vehicle speed moves to the intermediate speed range, said operation permit mode and said operation prohibited mode being set by said setting means based on whether a traction control operation was in progress when the vehicle speed moves to the intermediate speed range.

7. A traction control permit/prohibit determination apparatus according to claim 1, wherein said low speed range is approximately between 0 and 10 km/hr, said intermediate speed range is approximately between 10 and 40 km/hr, and said high speed range is approximately greater than 40 km/hr.

8. A traction control permit/prohibit determination apparatus for used in a vehicle having a plurality of wheels including a drive wheel, said apparatus comprising:

wheel speed detection means for detecting a speed of each wheel of the vehicle;

vehicle speed detecting means for detecting a vehicle speed based on the wheel speeds;

wheel spin detecting means for detecting a spinning of the drive wheel;

traction control means for applying a traction control operation, including applying a traction brake pressure to a brake system provided on the drive wheel, when said wheel spin detecting means detects spinning of the drive wheel;

pad temperature detecting means for detecting a temperature of a brake pad; and prohibit means for prohibiting a traction control operation based on the temperature of the brake pad, said prohibit means comprising means for setting said traction control means to an operation permit mode, in which a traction control operation is permitted, when the pad temperature is below a first predetermined temperature, and setting said traction control means to an operation prohibited mode, in which a traction control operation is prohibited, when the pad temperature is above a second predetermined temperature, said pad temperature detecting means comprising counting means for counting up at least while the traction brake pressure is applied, and counting down at least while the traction control means is in the operation prohibited mode, or while the traction control means is in the operation permit mode but said traction control means is not operated.

9. A traction control permit/prohibit determination apparatus according to claim 8, wherein said traction control means is set to an operation prohibited mode when a count value of the counting means exceeds a predetermined upper limit, and said traction control means is held in the operation prohibited mode until the count value becomes equal to or less than a predetermined lower limit.

10. A traction control permit/prohibit determination apparatus according to claim 8, wherein said counting means counts up only while the traction brake pressure is applied after the traction control means begins the traction control operation.

11. A traction control permit/prohibit determination apparatus according to claim 8, further comprising means for terminating traction control when an accelerator is released during said traction control.

12. A traction control permit/prohibit determination apparatus according to claim 8, wherein said pad temperature detecting means comprises means for estimating the temperature of the brake pad based on a count value of a counter that counts a period during which the traction brake pressure is applied.

13. A traction control permit/prohibit determination apparatus according to claim 8, wherein said second predetermined temperature is higher than said first predetermined temperature.

14. A traction control permit/prohibit determination apparatus for use in a vehicle having a plurality of wheels, and operable in low speed, intermediate speed, and high speed ranges, said apparatus comprising:

wheel speed detection means for detecting a speed of each wheel of the vehicle;

vehicle speed detecting means for detecting a vehicle speed based on the detected wheel speeds;

wheel spin detecting means for detecting a spinning of at least one of the wheels;

traction control means for applying a traction control operation, including applying a traction brake pressure to a brake system provided on at least one of the wheels, when said wheel spin detecting means detects spinning of at least one of the wheels;

first prohibit means for prohibiting a traction control operation by said traction control means based on the vehicle speed, said first prohibit means further comprising means for holding said traction control means in the operation permit mode, when the vehicle speed moves from the low speed range to the intermediate speed range with said traction control means being operated to control the traction of the vehicle; and second prohibit means for prohibiting a traction control operation of said traction control means based on a temperature of a brake pad of at least one of the wheels.

15. A traction control permit/prohibit determination apparatus according to claim 14, further comprising speed range determination means for determining whether the vehicle speed is in the low speed range, the intermediate speed range, or in a high speed range, said first prohibit means comprising means for setting said traction control means to an operation permit mode, in which a traction control operation is permitted, when the vehicle speed is in the low speed range, and setting said traction control means to an operation prohibited mode, in which a traction control operation is prohibited, when the vehicle speed is in the high speed range.

16. A traction control permit/prohibit determination apparatus according to claim 15, wherein said first prohibit means further comprises means for determining whether a traction control operation was in progress when the vehicle speed moves to the intermediate speed range, said operation permit mode and said operation prohibited mode being set by said setting means based on whether traction control was in progress when the vehicle speed moves to the intermediate speed range.

17. A traction control permit/prohibit determination apparatus according to claim 14, further comprising pad temperature detecting means for detecting the temperature of the brake pad, said second prohibiting means comprising means for setting said traction control means to an operation permit mode, in which a traction control operation is permitted, when the pad temperature is below a first predetermined temperature, and setting said traction control means to an operation prohibited mode, in which a traction control operation is prohibited, when the pad temperature is above a second predetermined temperature.

18. A traction control permit/prohibit determination apparatus according to claim 17, wherein said pad temperature detecting means comprises means for estimating the temperature of the brake pad based on a count value of a counter that counts a period during which the traction brake pressure is applied.

19. A traction control permit/prohibit determination apparatus for use in a vehicle having a plurality of wheels, said apparatus comprising:

wheel speed detection means for detecting a speed of each wheel of the vehicle;

vehicle speed detecting means for detecting a vehicle speed based on the detected wheel speeds;

wheel spin detecting means for detecting a spinning of at least one of the wheels;

traction control means for applying a traction control operation, including applying a traction brake pressure to a brake system provided on at least one of the wheels, when said wheel spin detecting means detects spinning of at least one of the wheels;

first prohibit means for prohibiting a traction control operation by said traction control means based on the vehicle speed; and second prohibit means for prohibiting a traction control operation of said traction control means based on a temperature of a brake pad of at least one of the wheels, said second prohibit means comprising counting means for counting up at least while the traction brake pressure is applied, and counting down at least while the traction control means is in the operation prohibited mode, or while the traction control means is in the operation permit mode but said traction control means is not operated.

20. The traction control permit/prohibit determination apparatus according to claim 19, said second prohibit means comprising means for estimating the temperature of the brake pad based on a count value of a counter that counts a period during which the traction brake pressure is applied.

* * * * *

UNITED STATES PATENT AND TRADEMARK OFFICE
CERTIFICATE OF CORRECTION

PATENT NO. : 5,455,771
DATED : October 3, 1995
INVENTOR(S) : Hideaki FUJIOKA

It is certified that error appears in the above-indentified patent and that said Letters Patent is hereby corrected as shown below:

```
At column  6, line 42, change "SPINi" to ---SPINi'---.
At column  6, line 47, change "[+" to ---[8+---.
At column  7, line 14, change "vmemi" to ---Vmemi---.
At column  9, line 44, change "PTMP" to ---PADTMP---.
At column 13, line 46 (claim 15, line 5), change "a"
to ---the---.
```

Signed and Sealed this

Twenty-third Day of July, 1996

Attest:

BRUCE LEHMAN

*Attesting Officer*      *Commissioner of Patents and Trademarks*